Sept. 8, 1959  R. C. WARREN  2,903,160
FEEDER FOR ORIENTATION DEVICE
Filed June 21, 1955
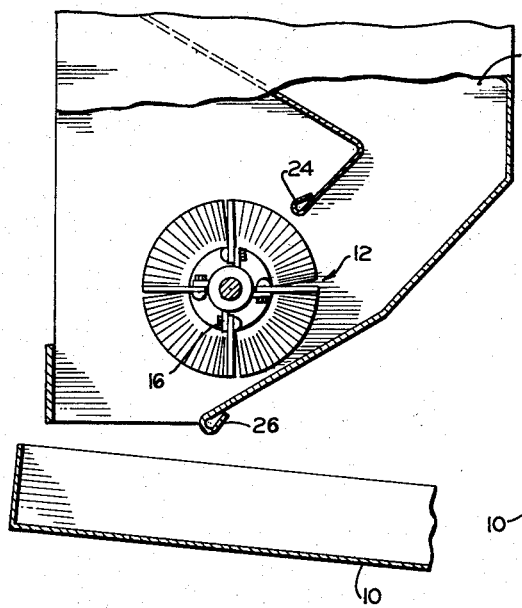
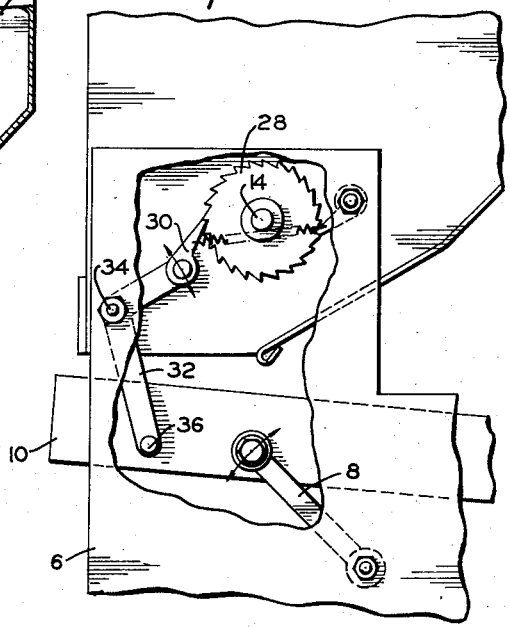
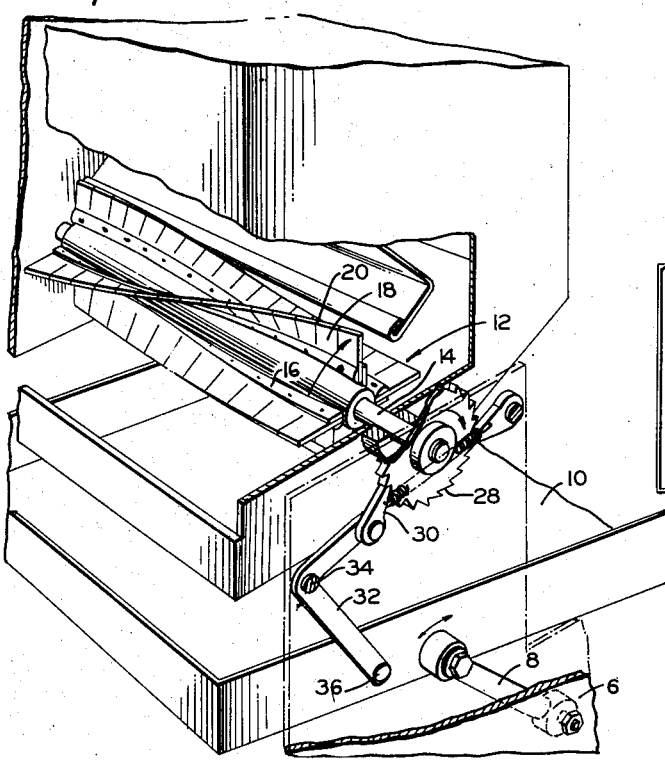
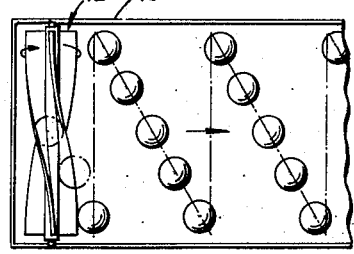
INVENTOR.
RAY C. WARREN
ECKHOFF & SLICK
ATTORNEYS
BY
A MEMBER OF THE FIRM

United States Patent Office 2,903,160
Patented Sept. 8, 1959

2,903,160

FEEDER FOR ORIENTATION DEVICE

Ray C. Warren, Woodland, Calif., assignor to Hershel California Fruit Products Co., Inc., a corporation of Illinois Application June 21, 1955, Serial No. 516,952

2 Claims. (Cl. 221—290)

This invention relates to a feeder for a fruit orientation device. Particularly, the present invention relates to a feeder for a device for orienting fruits which are commonly cut in halves, such as peaches, apricots, pears, apples and the like. In processing such fruit, it is conventional to first slice the fruit in half for the easy removal of the pit or core and it is desired that the fruit be presented to the next machine in a uniform, cut surface down position. For example after cutting the fruit in half, one may desire to next pass the fruit halves through a slicing machine and the slicing machine can only yield a maximum quantity of high grade slices if the fruit is presented in a cut surface down position.

The devices for securing the cut surface down position generally consist of a vibrating table having a series of open top, V-shaped troughs or grooves through which the fruit is made to pass by a vibrating action. As the fruit moves down the table in the V-shaped troughs, it is shaken and the shape of the troughs causes the fruit to be discharged with the cut surface down in what is generally designated a cup down position. One typical machine having V-shaped troughs wherein the troughs contain a series of corrugations, is shown in U.S. Patent 2,610,724. The discharge end of such devices is ordinarily constricted.

When feeding such cup down devices, it has heretofore been the practice to allow the fruit halves to slide onto the shaking table from a conveyor or chute, and it is frequently found that fruit halves will assume a linear position in adjacent troughs at right angles to the path of travel of the fruit. This does not interfere with the proper operation of orienting the fruit, but when the fruit comes to the constricted discharge end of the device, it tends to crowd and even become mashed if several halves of fruit are discharged from the cup down device at the same time.

It is therefore an object of the present invention to provide a feeder for a cup-down device wherein the fruit is distributed in such a manner in the troughs that adjacent troughs will not contain fruit halves which are in a line at right angles to the path of travel. In this manner, the fruit will not become crowded at the discharge end of the cup down device.

In general, the objects of the present invention are accomplished by providing a feeder for the fruit having a rotating proportioning device whereby only a single piece of fruit is deposited upon the orientation device at a time and subsequent pieces of fruit are placed in the orientation device offset both laterally and lengthwise from the piece of fruit previously deposited.

In the drawings forming a part of this application:

Figure 1 is a diagrammatic view in section of the device of the present invention.

Figure 2 is a side elevation of the device of the present invention with the housing cut away in order to show the reel advancing mechanism.

Figure 3 is a perspective view of the device of the present invention, partly in section.

Figure 4 is a diagrammatic plan view showing the manner in which the device of the present invention discharges fruit.

Referring now to the drawings by reference characters, there is shown a device having a frame member 6 to which are affixed a plurality of swinging support members 8, for supporting a shaking table 10. The shaking table 10 may be a conveyor which leads to the fruit orientating device proper or it may be the actual orientating device, having a series of troughs. Supported for rotation above the table is a reel which has been generally designated 12. The reel is supported for rotation by a shaft 14 and has a series of spiral arms 16 rigidly fastened thereto. The arms 16 may be suitably four in number, although other numbers of arms may be used. The arms 16 have a spiral configuration and normally the degree of the spiral is such that all of the spirals together would describe a complete circle. Thus, in the device illustrated, four arms are provided and each of the arms describes a spiral of about 90°. Attached to each of the arms 16 is a rectangular rubber member 18, which is preferably divided into a number of sections by the cuts 20 therein. The member 18 is preferably made of fairly stiff rubber which is stiff enough so that it will not be deflected unduly by the fruit and let fruit pass over it yet will be soft enough to not injure fruit into which it comes in contact.

Situated over the reel 12 is a hopper 22, which is provided with an upper throat member 24 and a lower throat member 26 forming a throat which is slightly smaller than the diameter of the reel 12.

For actuating the reel 12, a rachet wheel 28 is provided, which is actuated by a pawl 30. Pawl 30 is held by the L-shaped arm 32, which is pivoted at point 34 on the frame 10. The lower portion of the L-shaped arm 32 is attached to the table 10 at point 36. Thus, as the table 10 oscillates, the arm 32 is actuated, which in turn rotates the reel 12 in a step-wise manner. As the reel 12 turns, fruit is engaged between the members 20 and discharged one piece at a time onto the table as is shown in Figure 4. In this manner, the fruit is distributed on table 12, as is shown in Figure 4, and it is obvious that no two pieces of fruit will arrive at the end of the discharge trough at exactly the same time. Thus, crowding at the discharge end of the fruit orientation device is obviated.

Although the feeder of the present invention has been described in conjunction with a fruit orientating device, it is obvious that the feeder may be used in any application wherein it is desired to deposit fruit on a conveyor in such a manner that the fruit will be discharged from the conveyor one piece at a time.

I claim:

1. A feeder for food sections comprising: a hopper for fruit sections, said hopper terminating in a downwardly extending chute inclined to the horizontal, said chute having an enclosed top and a flat, smooth lower surface for the support of a plurality of said fruit sections, a rectangular throat at the discharge end of said chute, said throat having a height at least equivalent to the thickness of said sections and being of sufficient width to accommodate a plurality of fruit sections simultaneously; a rotor mounted transversely of said throat and extending substantially the entire length thereof, said rotor having a series of spiral blades thereon extending substantially the entire length of said rotor, said blades being of sufficient height to substantially close said throat; a downwardly inclined vibrating table positioned directly beneath the discharge end of said throat; means for vibrating said table; and a ratchet on said rotor operatively associated with said table whereby vibration of said table drives said ratchet and said rotor, whereby to discharge fruit sections supported by said lower surface of said downwardly extending chute; said fruit sections being discharged individually and sequentially from said throat onto said table.

2. A feeder for fruit sections comprising: a hopper for fruit sections, said hopper terminating in a downwardly extending chute inclined to the horizontal; said chute having an enclosed top and a flat, smooth lower surface for support of a plurality of said fruit sections; a rectangular throat at the discharge end of said chute, said throat having a height at least equivalent to the thickness of said sections and being of sufficient width to accommodate a plurality of fruit sections simultaneously, a rotor mounted transversely of said throat extending substantially the entire length thereof, said rotor having a series of spiral blades thereon extending substantially the entire length of said rotor, each of said spiral blades on said rotor being constructed of a resilient material and being longitudinally divided into segments, said blades being of sufficient height to substantially close said throat; and means for rotating said rotor, whereby the passage of fruit sections supported by said downwardly extending chute's lower surface is governed by said rotor and said blades and said fruit sections are discharged individually and sequentially from said hopper.

References Cited in the file of this patent
UNITED STATES PATENTS

| | | |
|---|---|---|
| 208,599 | Hildrup et al. | Oct. 1, 1878 |
| 261,337 | Gray | July 18, 1882 |
| 766,539 | Smith | Aug. 2, 1904 |
| 1,842,452 | Jacobson et al. | Jan. 26, 1932 |
| 1,890,883 | Morton et al. | Dec. 13, 1932 |
| 2,274,065 | Hull et al. | Feb. 24, 1942 |
| 2,475,381 | Erickson | July 5, 1949 |